US012634118B2

(12) United States Patent
Hamburg et al.

(10) Patent No.: US 12,634,118 B2
(45) Date of Patent: May 19, 2026

(54) LOW LATENCY METADATA DECRYPTION USING HASH AND PSEUDORANDOM FUNCTIONS

(71) Applicant: Cryptography Research, Inc., San Jose, CA (US)

(72) Inventors: Michael Alexander Hamburg, 's-Hertogenbosch (NL); Evan Lawrence Erickson, Chapel Hill, NC (US); Ajay Kapoor, Eindhoven (NL)

(73) Assignee: Cryptography Research, Inc., San Jose, CA (US)

( * ) Notice: Subject to any disclaimer, the term of this patent is extended or adjusted under 35 U.S.C. 154(b) by 191 days.

(21) Appl. No.: 18/659,987

(22) Filed: May 9, 2024

(65) Prior Publication Data

US 2024/0388420 A1      Nov. 21, 2024

Related U.S. Application Data

(60) Provisional application No. 63/502,523, filed on May 16, 2023.

(51) Int. Cl.
*H04L 9/06*                (2006.01)
(52) U.S. Cl.
CPC .......... *H04L 9/0643* (2013.01); *H04L 9/0618* (2013.01); *H04L 9/0656* (2013.01)
(58) Field of Classification Search
CPC .... H04L 9/0643; H04L 9/0618; H04L 9/0656
See application file for complete search history.

(56) References Cited

U.S. PATENT DOCUMENTS

| | | | | |
|---|---|---|---|---|
| 6,711,400 B1 * | 3/2004 | Aura | ................... | H04W 12/069 |
| | | | | 455/433 |
| 6,845,449 B1 * | 1/2005 | Carman | ................. | H04L 63/12 |
| | | | | 713/170 |
| 10,608,822 B2 * | 3/2020 | Boehl | ................... | H04L 9/3242 |
| 10,623,176 B2 * | 4/2020 | Minematsu | .......... | H04L 9/0662 |
| 10,984,411 B1 * | 4/2021 | Hayes | ................. | G06Q 20/387 |
| 11,265,144 B2 | 3/2022 | Sofia et al. | | |
| 2008/0104397 A1 * | 5/2008 | Paddon | ................. | H04L 9/3242 |
| | | | | 713/168 |

FOREIGN PATENT DOCUMENTS

| | | | | | |
|---|---|---|---|---|---|
| CN | 116644441 A | * | 8/2023 | ........... | H04W 12/03 |
| CN | 116647567 A | * | 8/2023 | .......... | H04L 67/108 |
| CN | 112385175 B | * | 4/2024 | .......... | H04L 9/0643 |
| WO | WO-9849855 A2 | * | 11/1998 | .......... | H04W 12/069 |

* cited by examiner

*Primary Examiner* — Mohammed Waliullah
(74) *Attorney, Agent, or Firm* — Lowenstein Sandler LLP

(57)                ABSTRACT

Systems and techniques for cryptographically protecting data in a computer memory are disclosed. The techniques include dividing the data into a first portion and a second portion, encrypting the first portion of the data to create a first stored form of the data, encrypting the second portion of the data, and storing, in the computer memory, the first stored form of the data and a second stored form of the data. The techniques include, to encrypt the second portion, calculating a hash based on the first stored form of the data, applying a first pseudorandom function to the hash to obtain a bit sequence, and combining the bit sequence with the second portion of the data to obtain the second stored form of the data.

20 Claims, 6 Drawing Sheets

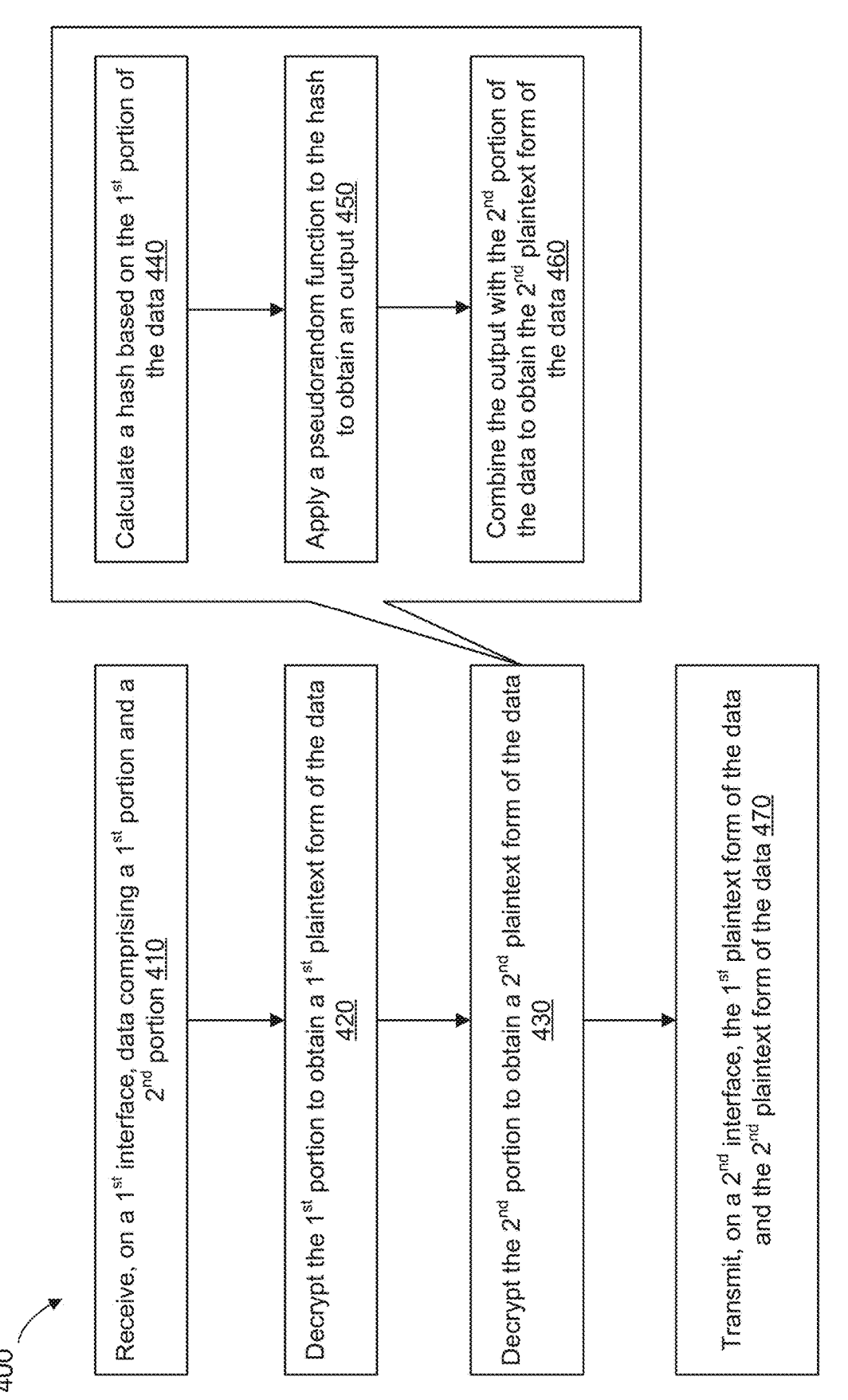

Receive, on a 1st interface, data comprising a 1st portion and a 2nd portion 410

Decrypt the 1st portion to obtain a 1st plaintext form of the data 420

Decrypt the 2nd portion to obtain a 2nd plaintext form of the data 430

Calculate a hash based on the 1st portion of the data 440

Apply a pseudorandom function to the hash to obtain an output 450

Combine the output with the 2nd portion of the data to obtain the 2nd plaintext form of the data 460

Transmit, on a 2nd interface, the 1st plaintext form of the data and the 2nd plaintext form of the data 470

LOW LATENCY METADATA DECRYPTION USING HASH AND PSEUDORANDOM FUNCTIONS

RELATED APPLICATIONS

This application claims the benefit of U.S. Provisional Patent Application No. 63/502,523, filed May 16, 2023, the contents of which are incorporated by reference in its entirety herein.

TECHNICAL FIELD

The disclosure pertains to computing applications, more specifically to systems and techniques that cryptographically protect data in a computer memory.

BACKGROUND

Modern computer systems generally include one or more memory devices, such as those on a memory module. The memory module may include, for example, one or more random access memory (RAM) devices or dynamic random access memory (DRAM) devices. A memory device may include memory banks made up of memory cells that a memory controller or memory client accesses through a command interface and a data interface within the memory device. The memory device may be used to store encrypted data.

BRIEF DESCRIPTION OF THE DRAWINGS

The present disclosure is illustrated by way of example, and not by way of limitation, in the figures of the accompanying drawings.

FIG. 4 is a flow diagram of an example method of reduced latency metadata decryption using a cryptographic circuit, according to at least one embodiment.

DETAILED DESCRIPTION

Figure 1:
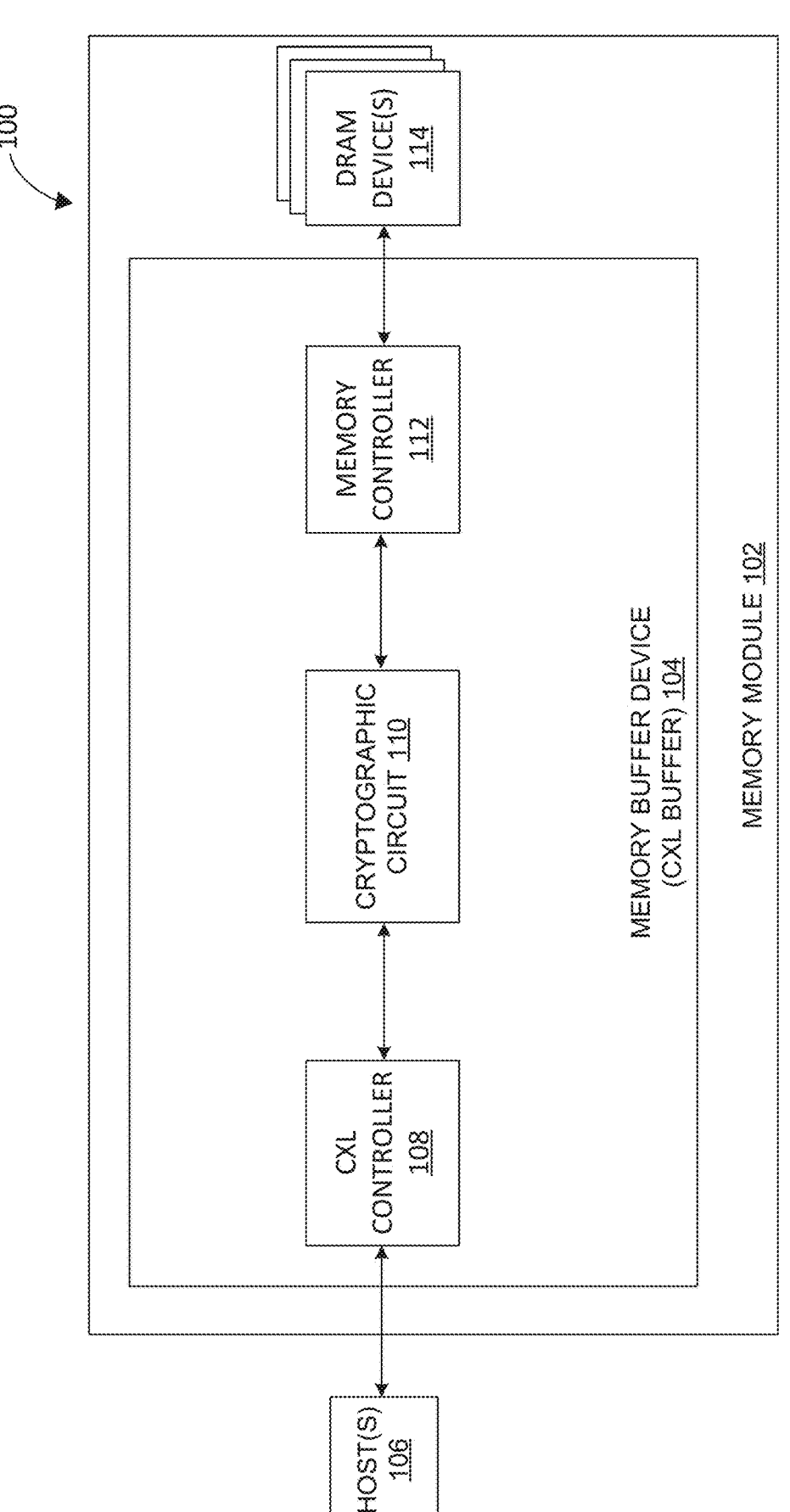
FIG. 1 is a block diagram of a memory system with a memory module that includes a cryptographic circuit for reduced latency metadata decryption, according to at least one embodiment.

The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

Datacenter architectures are evolving to support the workloads of emerging applications in artificial intelligence and machine learning that require a high-speed, low-latency, cache-coherent interconnect. Compute Express Link® (CXL®) is an industry-supported cache-coherent interconnect for processors, memory expansion, and accelerators. The CXL® technology defines mechanisms called Integrity and Data Encryption (IDE) for providing confidentiality, integrity, and replay protection for data transferred over a CXL® link. The CXL® IDE mechanism may secure traffic within a Trusted Execution Environment (TEE) of multiple components using one or more cryptographic algorithms.

In some embodiments, an inline memory encryption (IME) module may be used to encrypt/decrypt data at rest using one or more cryptographic algorithms, such as an Advanced Encryption Standard (AES) XOR-Encrypt-XOR with Tweak and Block Ciphertext Stealing (XTS) algorithm (hereinafter AES-XTS algorithm). The AES-XTS algorithm may use a block-based cipher (e.g., AES-128, AES-256, etc.) for encryption and decryption. The AES-XTS algorithm may divide data into fixed-sized blocks (e.g., based on the size of the block cipher) and encrypt/decrypt each block separately using AES encryption and a tweakable block cipher. The tweak value may be determined from the block number and a key that is shared between encryption and decryption operations. Other encryption and authentication algorithms may be used.

Storage and encryption of cache line metadata (also referred to as "metadata" herein) associated with cache line data is a desirable capability for confidential computing over, for example, a CXL interface. The metadata may, for example, contain coherency information for a Modified-Exclusive-Shared-Invalid (MESI) cache coherency protocol, TEE ownership tracking information, a message authentication code (MAC), a poison bit, device private metadata, and/or the like. In some instances, the IME algorithm AES-XTS can be used to encrypt the metadata. However, the CXL® protocol is highly sensitive to latency, and AES-XTS can incur a latency penalty when it is used to encrypt cache line metadata in addition to the corresponding cache line data.

Hardware implementations of AES may include an AES engine and/or AES cores that perform a series of transformations that operate on input data to produce an output. In some instances, AES cores can take 14 cycles to decrypt encrypted cache line data and an additional 14 cycles to decrypt encrypted cache line metadata, totaling 28 cycles. For example, four 128-bit AES cores of an AES engine can decrypt 512-bit cache line data on a first pass and can decrypt 16 bits of corresponding metadata on a second pass. On the first pass, the four 128-bit AES cores can decrypt the 512-bit cache line data to output a 512-bit result using 14 cycles. Because AES is a block cipher, it requires an input that matches the block size (e.g., 128 bits). When the metadata is less than the block size, it needs to be padded (e.g., using bits of the encrypted cache line data) so it matches the block size. For example, a 16-bit metadata may be padded with 112 bits of data to obtain a 128-bit block that can be decrypted. Then on a second pass, the padded metadata may be decrypted using a 128-bit AES core to obtain a 128-bit output using 14 cycles. Thus, decrypting cache line data and metadata encrypted using AES-XTS may require 28 clock cycles.

Although the AES block cipher used in XTS mode is discussed throughout, it should be seen as a non-limiting example. AES may be replaced by another block cipher (e.g., SM4) and the XTS mode may be replaced by another mode that suffers from additional latency when encrypting/decrypting data that is less than a full block size.

Aspects of the present disclosure overcome these challenges and others by providing a cryptographic circuit that can decrypt encrypted metadata using a few (e.g., 1, 2, 3) additional cycles, thereby reducing the overall latency required to read protected (e.g., encrypted) data and metadata from a memory device. In some embodiments, the cryptographic circuit may use the AES-XTS algorithm to perform cryptographic operations (e.g., encryption, decryption) on cache line data and may use a hash function and a pseudorandom function to generate a bit sequence that can be combined with the cache line metadata for encryption/decryption. For example, after the cache line data has been encrypted (e.g., using AES-XTS) to obtain a ciphertext, the ciphertext may be provided as input into a hash function. In some embodiments, the hash function is a universal hash function. In some embodiments, the hash function is an almost-universal hash function. In some embodiments, the hash function receives as an additional input an address associated with the cache line data, an address associated with the metadata, and/or a key. The hash function may generate a hash based on the provided input(s). The hash may be provided as input to a pseudorandom function. In some embodiments, the pseudorandom function is a cryptographic pseudorandom function, such as AES. In some embodiments, the pseudorandom function may also receive, as input, a key. The pseudorandom function may be a block cipher, and the hash function may generate an output that matches the block size of the block cipher. The pseudorandom function may generate an output bit sequence that is combined (e.g., XOR'd) with the metadata to obtain the encrypted metadata. Both the encrypted cache line data and the encrypted metadata may be stored in a memory device.

During decryption of the data, the encrypted cache line data and the encrypted metadata may be loaded from the memory device. During decryption of the encrypted cache line data (e.g., using AES-XTS which takes 14 cycles), the bit sequence required to decrypt the encrypted metadata may be calculated. To generate the bit sequence, the ciphertext (and in some embodiments, the address of the cache line data, the address of the metadata, a key, and/or other data) is (are) provided as input to the hash function. The hash function may take a few (e.g., less than 3 cycles). The resulting hash (and in some embodiments, a key) may be provided to the pseudorandom function to generate the bit sequence that, when combined (e.g., XOR'd) with the encrypted metadata, produces the original, plaintext metadata. The pseudorandom function may take about the same number of cycles as the decryption of the cache line data (e.g., 14). Thus, decrypting cache line data encrypted using AES-XTS and metadata encrypted using a combination of a hash function and a pseudorandom function may require less than 17 clock cycles.

The advantages of the disclosed techniques include but are not limited to a decreased latency when decrypting encrypted cache line metadata of a memory device.

System Architecture

FIG. 1 is a block diagram of a memory system 100 with a memory module 102 that includes a cryptographic circuit 110 for reduced latency metadata decryption, according to at least one embodiment. In one embodiment, the memory module 102 includes a memory buffer device 104 and one or more DRAM device(s) 114. In one embodiment, the memory buffer device 104 is coupled to one or more DRAM device(s) 114 and one or more host(s) 106.

In one embodiment, the memory buffer device 104 includes a CXL controller 108 and a memory controller 112. The CXL controller 108 is coupled to one or more host(s) 106. The memory controller 112 is coupled to the one or more DRAM devices 114. In at least one embodiment, the memory buffer device 104 is implemented in a memory expansion device, such as a CXL memory expander SoC of a CXL NVM module or a CXL module. In at least one embodiment, the memory buffer device 104 includes a cryptographic circuit 110 for reduced latency decryption of metadata associated with cache lines being read from a DRAM device(s) 114. In some embodiments, the cryptographic circuit 110 may be an in-line memory encryption (IME) block and/or used in conjunction with a separate IME block. The cryptographic circuit 110 may receive data from a host(s) 106 (e.g., via the CXL controller 108), may encrypt the data, and may provide the data for storage in a DRAM device(s) 114 (e.g., via the memory controller 112). In at least one embodiment, the received data is unencrypted (e.g., plaintext data) and is encrypted by the cryptographic circuit 110 before storage. In at least one embodiment, the received data is already encrypted (e.g., ciphertext data) and is further encrypted by the cryptographic circuit 110 before storage. The received data may include a first portion (e.g., cache line data) and a second portion (e.g., cache line metadata). In at least one embodiment, the received data is encrypted for transit (e.g., between host(s) 106 and memory module 102) and decrypted by the CXL controller 108 to obtain a plaintext form of the data. The plaintext form of the data may then be encrypted for storage by the cryptographic circuit 110. In at least one embodiment, the first portion of the data is encrypted and the second portion of the data is plaintext before both being encrypted by the cryptographic circuit 110.

In at least one embodiment, the CXL controller 108 includes two interfaces, a host memory interface (e.g., CXL.mem) and a management interface (e.g., CXL.io). The host memory interface can receive, from the host(s) 106, one or more memory access commands of a remote memory protocol, such as Compute Express Link (CXL) protocol, Gen-Z, Open Memory Interface (OMI), Open Coherent Accelerator Processor Interface (OpenCAPI), or the like. The management interface can receive, from the host(s) 106, one or more management commands of the remote memory protocol.

The cryptographic circuit 110 can include one or more cryptographic cores, such as AES-128 cores and/or AES-256 cores. In at least one embodiment, the cryptographic circuit 110 includes at least four 128-bit AES cores that can simultaneously decrypt a 512-bit cache line. In some embodiments, the cryptographic circuit 110 includes a hash function and a pseudorandom function. In at least one embodiment, the hash function is an almost-universal hash function, such as GHASH. In another embodiment, the hash function is a universal hash function. In at least one embodiment, the pseudorandom function is an AES function, such as AES-128.

The cryptographic circuit 110 may receive data for storage (e.g., from a host(s) 106, from the CXL controller 108) including a first portion and a second portion. In at least one embodiment, the first portion is 512 bits of cache line data and the second portion is less than 128 bits (e.g., the size of the block cipher used to encrypt the first portion of the data) of metadata. The metadata may include coherency information for a MESI cache coherency protocol, TEE ownership tracking information, a MAC, a poison bit, device private metadata, error correcting codes (ECC), and/or the like. In at least one embodiment, the first portion is encrypted using four 128-bit AES cores using the AES-XTS algorithm to obtain a ciphertext. The AES-XTS algorithm may use an encryption key and a tweak key. In some embodiments, the encryption key is the first 128 bits of a 256-bit key and the tweak key is the last 128 bits of the 256-bit key. In another embodiment, the first portion is encrypted using SM4 cores (e.g., four 128-bit cores) using the XTS block-cipher mode. The ciphertext (e.g., stored form of the data) generated by encrypting the first portion of the data may be provided as input into a hash function of the cryptographic circuit 110.

In some embodiments, the hash function of the cryptographic circuit 110 also receives as an input (e.g., in addition to the ciphertext) an address associated with the first portion of the data, an address associated with the second portion of the data, a key, and/or other security relevant information. The hash generated by the hash function based on the provided input(s) may be provided as input to a pseudorandom function of the cryptographic circuit 110. In at least one embodiment, the pseudorandom function of the cryptographic circuit 110 also receives, as input, a key. The pseudorandom function may be a block cipher that requires an input of a fixed size (e.g., 128 bits). Because the length of the ciphertext may be greater (or smaller) than the required length of the input of the pseudorandom function, the hash function may be used to ensure the input to the pseudorandom function is the correct size. In at least one embodiment, the length of the ciphertext is the same as the length required for the input of the pseudorandom function, and the ciphertext is provided directly to the pseudorandom function without going through the hash function. In another embodiment, a pseudorandom function is used that can accept a variable-length input (e.g., TurboSHAKE) and the ciphertext is provided directly to the pseudorandom function without going through the hash function.

In at least one embodiment, the pseudorandom function outputs a bit sequence that is combined (e.g., XOR'd) with the second portion of the data to encrypt the second portion. The cryptographic circuit 110 may then provide (e.g., to the memory controller 112) the encrypted first portion and the encrypted second portion for storage (e.g., in the DRAM device(s) 114). In at least one embodiment, the encrypted second portion is further encrypted before being stored. The second portion (e.g., metadata) can be stored and transferred as side-band metadata or in-line metadata, as illustrated and described below with respect to FIG. 2.

In at least one embodiment, the key used for the hash function is different than the key used for the pseudorandom function. The key used for the hash function and the key used for the pseudorandom function may both be different than the encryption key and the tweak key used during encryption of the first portion of the data. In at least one embodiment, one of the keys is derived using a pseudorandom function based on an address of data (e.g., the first portion of the data, the second portion of the data, etc.). In at least one embodiment, one of the keys is a global key that is generated when a system is initialized. In at least one embodiment, one of the keys is obtained from a lookup table based on an address of data (e.g., the first portion of the data, the second portion of the data, etc.). In at least one embodiment, all the keys are derived from a shared base key (e.g., while loading data from RAM). In at least one embodiment, a key is refreshed (e.g., modified, regenerated, updated, etc.) when the address of the first portion of the data is cleared, ensuring a unique key is used for encryption at each memory address.

The cryptographic circuit 110 may receive a request (e.g., from a host(s) 106, from the CXL controller 108) to load data from storage. Cryptographic circuit 110 may then retrieve (e.g., from the memory controller 112, from a DRAM device(s) 114) the data, which includes, in at least one embodiment, a first portion that is 512 bits of cache line data and a second portion is less than 128 bits (e.g., the size of the block cipher used to encrypt the first portion of the data) of metadata. The cryptographic circuit 110 may then decrypt the received data.

In one embodiment, the cryptographic circuit 110 decrypts the first portion of the data and the second portion of the data in parallel. For example, in at least one embodiment, the 512-bit encrypted cache line data is decrypted using four 128-bit AES cores, which takes about 14 cycles. During those 14 cycles, a hash of the encrypted cache line data is generated using the hash function of the cryptographic circuit 110. The hash is then provided to the pseudorandom function of the cryptographic circuit 110 to generate an output bit sequence. The output bit sequence can be combined (e.g., XOR'd) with the encrypted second portion of the data to decrypt the second portion. If the second portion was further encrypted before being stored, the second portion may be decrypted using an inverse of the encryption function used for the further encryption before being combined with the output bit sequence. If the hash function and/or the pseudorandom functions were keyed using additional inputs during the encryption process, the same additional inputs are used during decryption of the first portion of the data and the second portion of the data.

In at least one embodiment, the pseudorandom function of the cryptographic circuit 110 used to encrypt/decrypt the second portion of the data is an AES function (e.g., AES-128). Therefore, generating the output of the pseudorandom function during decryption of the second portion of the data may take 14 cycles. In some embodiments, a separate (e.g., fifth) AES core is used to perform the pseudorandom function while the first portion of the data is being decrypted. Generating the hash using the hash function of the cryptographic circuit 110 may take a few cycles (e.g., less than 3). Thus, decrypting the first portion of the data and the second portion of the data, when performed in parallel, may take less than 17 cycles.

Using the hash function and the pseudorandom function to generate a bit sequence used to encrypt the metadata may not provide perfect security, but in some instances, it may be advantageous to have reduced latency decryption of metadata instead of the additional latency that would be required for improved security.

Figure 2:
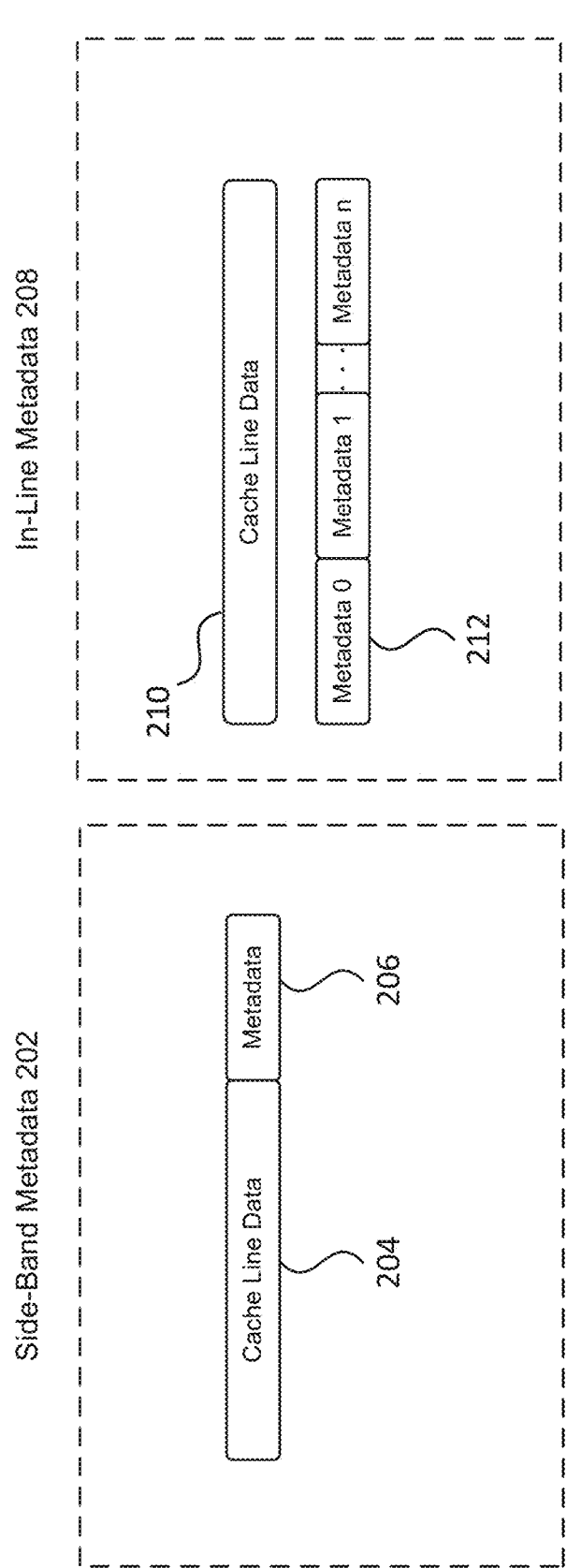
FIG. 2 is a diagram illustrating examples of storing cache line data and corresponding metadata, according to at least one embodiment.

FIG. 2 is a diagram illustrating examples of storing cache line data 204 and 210 and corresponding metadata 206 and 212, according to at least one embodiment. In general, the metadata can be stored as side-band metadata 202 or in-line metadata 208. In side-band metadata 202, the metadata 206 is stored alongside cache line data 204, and the metadata 206 can be accessible when the cache line data 204 is read from memory. In in-line metadata 208, the metadata 212 is stored in another location than the cache line data 210, such as in a static RAM (SRAM) or DRAM. When the cache line data 210 is read, an additional memory read would be performed to retrieve the metadata 212.

Figure 3A:
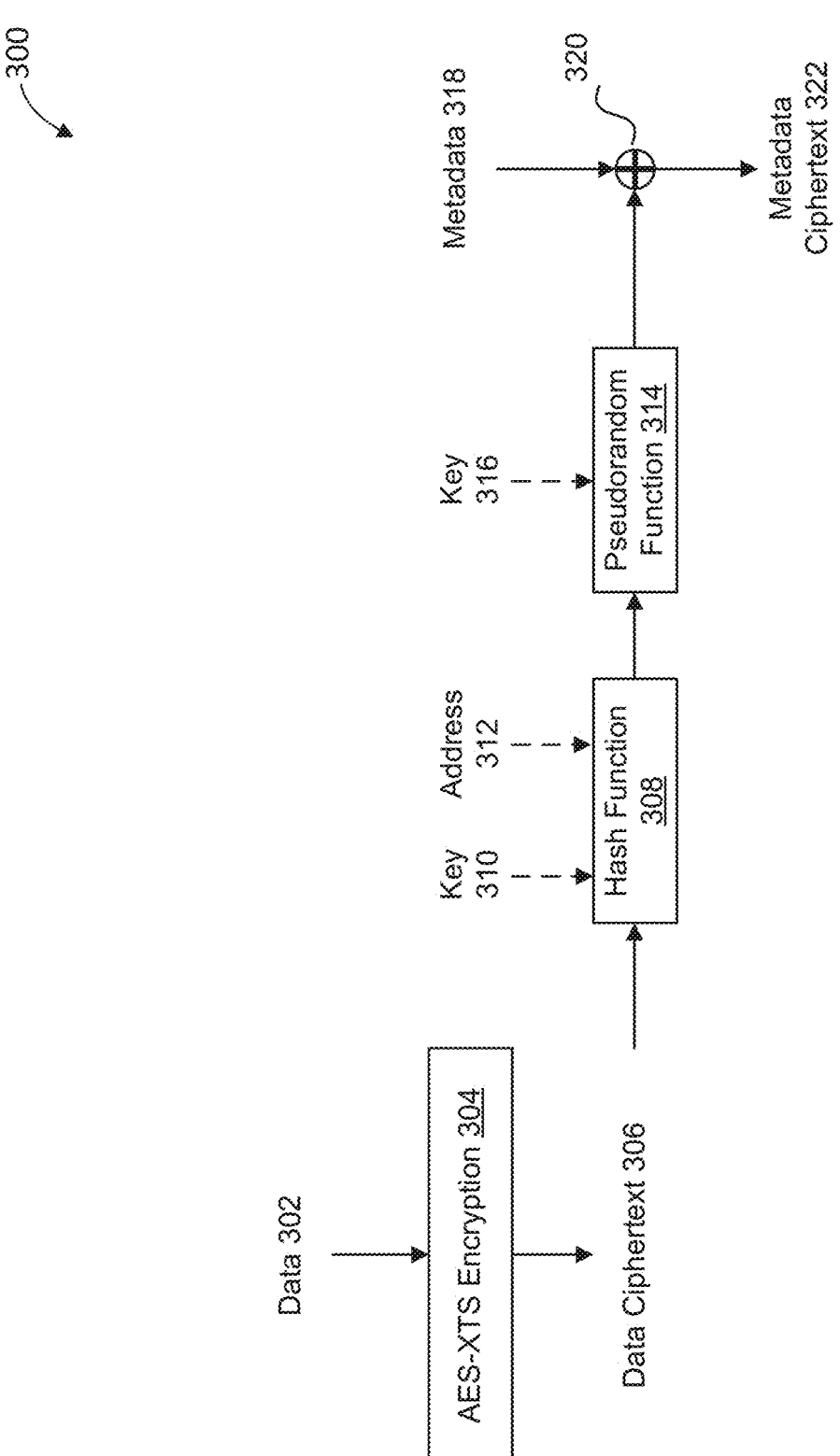
FIG. 3A is a data flow diagram illustrating a method of data and metadata encryption using a cryptographic circuit, according to at least one embodiment.

FIG. 3A is a data flow diagram illustrating a method 300 of data and metadata encryption using a cryptographic circuit, according to at least one embodiment. In at least one embodiment, method 300 is performed by the cryptographic circuit 110. Data 302 and metadata 318 may be received to be encrypted. Data 302 may be encrypted by AES-XTS encryption 304 to obtain data ciphertext 306. Data ciphertext 306 may then be provided to hash function 308. In some embodiments, hash function 308 may receive as additional inputs key 310 and/or address 312, depicted with dashed lines. Key 310 may be derived using a pseudorandom function based on the address of the data 302 or the address of the metadata 318, a global key generated during initialization of a system and used for multiple address locations, a key obtained from a lookup table based on the address of the data 302 or the address of the metadata 318, or the like. Address 312 may be the address of the data 302 or the address of the metadata 318. In at least one embodiment, hash function 308 may receive other data as additional input, such as an identifier of a virtual machine that is accessing data or some other security-relevant information.

The output hash generated by hash function 308 may be provided as an input to pseudorandom function 314, which may be a cryptographic pseudorandom function. In some embodiments, only a portion of the output hash generated by hash function 308 is provided as an input to pseudorandom function 314. In at least one embodiment, pseudorandom function 314 also receives as an input key 316. In another embodiment, pseudorandom function 314 may receive another data as an additional input. Key 316 may be derived using a pseudorandom function based on the address of the data 302 or the address of the metadata 318, a global key generated during initialization of a system and used for multiple address locations, a key obtained from a lookup table based on the address of the data 302 or the address of the metadata 318, or the like. The pseudorandom function used to derive key 310 and/or key 316 can be different than the pseudorandom function 314.

The output bit sequence generated by pseudorandom function 314 may be combined (320) with metadata 318 to obtain metadata ciphertext 322, which may then be stored as side-band metadata with data ciphertext 306 or as in-line metadata in a separate location from data ciphertext 306.

In at least one embodiment, a MAC is calculated for the encrypted data to ensure message integrity. The MAC may be calculated by the cryptographic circuit 110 or another circuit. In at least one embodiment, at least one intermediate calculation generated during execution of the hash function can be shared between generating the MAC and generating the bit sequence to encrypt the metadata.

Figure 3B:
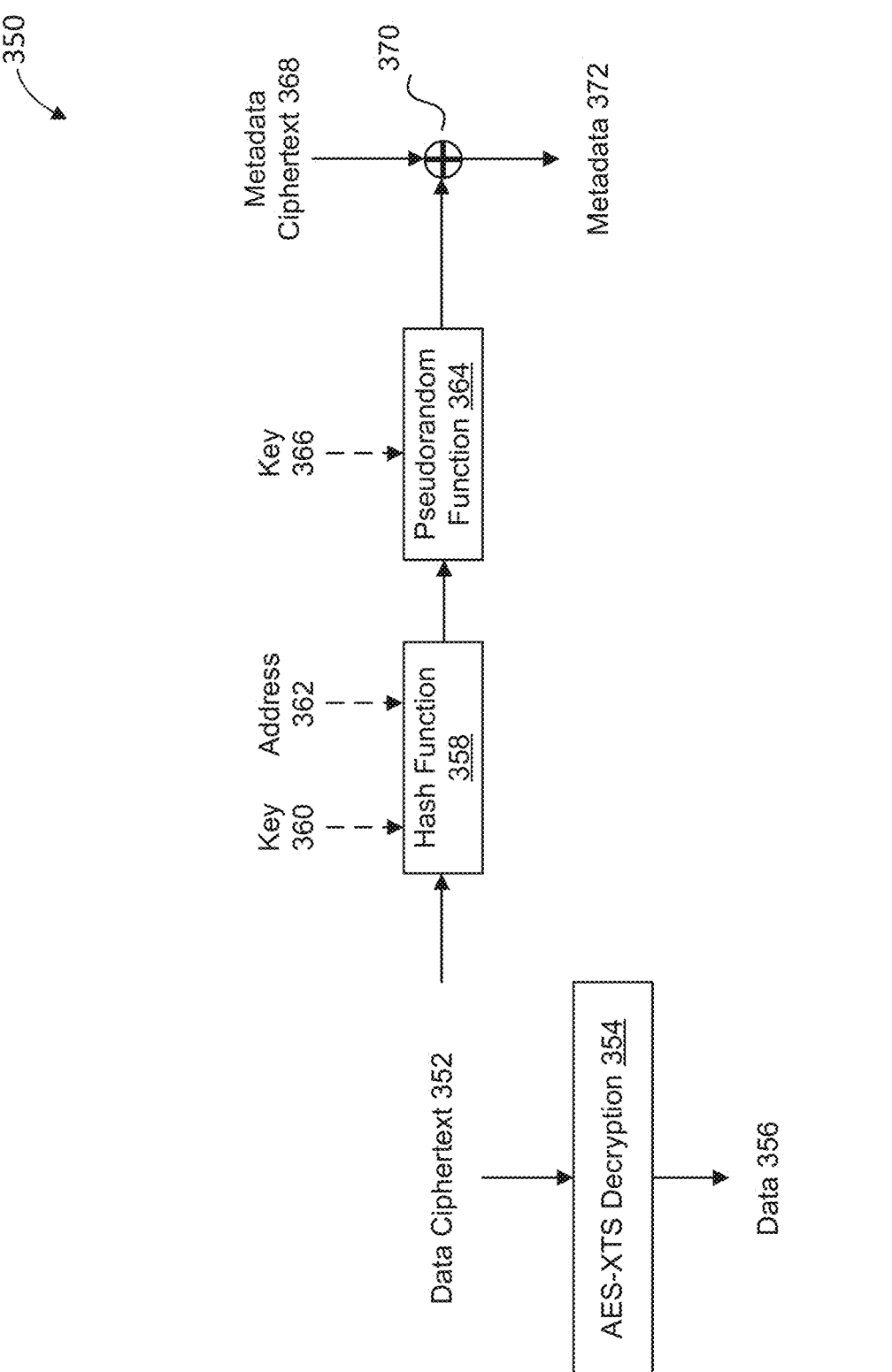
FIG. 3B is a data flow diagram illustrating a method of data decryption and reduced latency metadata decryption using a cryptographic circuit, according to at least one embodiment.

FIG. 3B is a data flow diagram illustrating a method 350 of data decryption and reduced latency metadata decryption using a cryptographic circuit, according to at least one embodiment. In at least one embodiment, method 350 is performed by the cryptographic circuit 110. Data ciphertext 352 and metadata ciphertext 368 may be received to be decrypted. Data ciphertext 352 may be decrypted by AES-XTS decryption 354 to obtain data 356. Simultaneous to data ciphertext 352 being decrypted, data ciphertext 352 (or a copy of data ciphertext 352) may be provided to hash function 358 to generate a hash. In some embodiments, hash function 358 receives as additional inputs key 360 and/or address 362. The hash may be provided as an input to pseudorandom function 364, which may generate an output bit sequence. In at least one embodiment, pseudorandom function 364 receives as an additional input key 366. The output of pseudorandom function 364 may be combined (370) with metadata ciphertext 368 to obtain metadata 372. Key 360, address 362, and key 366 may be the same, respectively, as key 310, address 312, and key 316 for a given ciphertext.

FIG. 4 is a flow diagram of an example method 400 of reduced latency metadata decryption using a cryptographic circuit, according to at least one embodiment. The method 400 may be performed by processing logic that may comprise hardware (e.g., circuitry, dedicated logic, programmable logic, microcode, etc.), software (e.g., instructions run on a processing device to perform hardware simulation), or a combination thereof. For example, method 400 may be performed by one or more CPUs, graphics processing units (GPUs), parallel processing units (PPUs), dedicated accelerator circuits, and the like, or any combination thereof. In one embodiment, the method 400 is performed by the cryptographic circuit 110 of FIG. 1.

Processing logic performing method 400 may, at block 410, receive, on a first interface, data including a first portion and a second portion. The first interface may be coupled to a storage device (e.g., DRAM), a memory controller, a message bus, or another component of a computing system. In at least one embodiment, the first portion is 512 bits long and the second portion is less than 128 bits long. At block 420, the processing logic may decrypt the first portion of the data to obtain a first plaintext form of the data. In one embodiment, the decryption may be performed using the AES-XTS algorithm. At block 430, the processing logic may decrypt the second portion of the data to obtain a second plaintext form of the data.

As depicted in the callout box, to decrypt the second portion of the data, the processing logic may, at block 440, calculate a hash based on the first portion of the data. The hash may be calculated using a hash function, such as a universal hash function or an almost-universal hash function. In at least one embodiment, the universal hash function receives, as an additional input, a key and/or an address. At block 450, the processing logic may apply a pseudorandom function to the hash to obtain an output. The output may be a bit sequence. The output of the pseudorandom function may be the same length as the hash generated by the hash function (e.g., 128 bits). At block 460, the processing logic may combine the output with the second portion of the data to obtain the second plaintext form of the data.

At block 470, the processing logic may transmit, on a second interface, the first plaintext form of the data and the second plaintext form of the data. The second interface may be coupled to a host device, a CXL controller, a message bus, or another component of a computing system.

Figure 5:
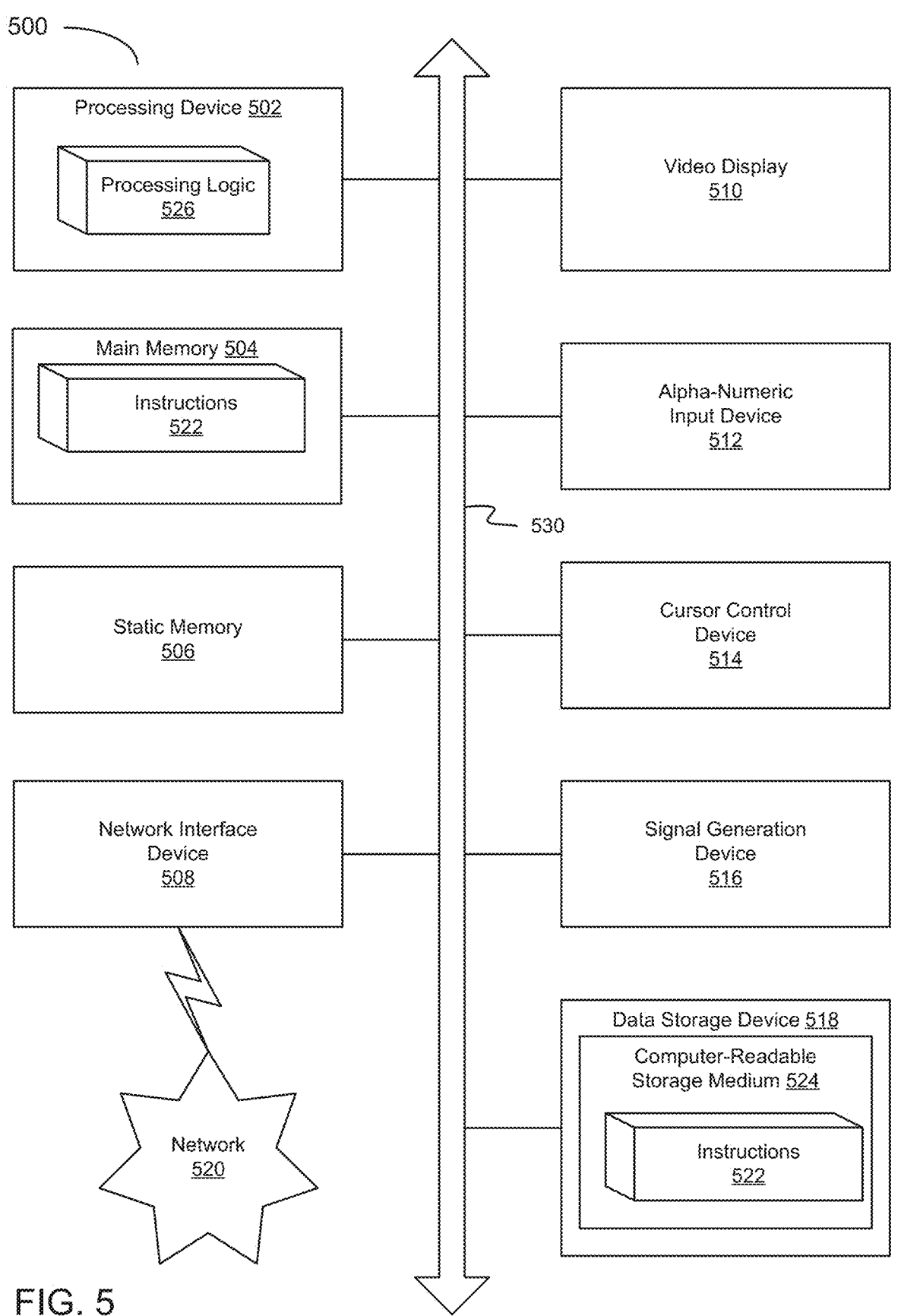
FIG. 5 is a block diagram of an example computer system operating in accordance with one or more aspects of the present disclosure.

FIG. 5 is a block diagram of an example computer system 500 operating in accordance with one or more aspects of the present disclosure. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 (which can include processing logic 526) represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 522 for implementing the cryptographic circuit 110 of FIG. 1 and to perform the operations discussed herein (e.g., method 300 of FIG. 3A, method 350 of FIG. 3B, and/or method 400 of FIG. 4).

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker). In one illustrative example, the video display unit 510, the alphanumeric input device 512, and the cursor control device 514 may be combined into a single component or device (e.g., an LCD touch screen).

The data storage device 518 may include a computer-readable storage medium 524 on which is stored the instructions 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable media. In some implementations, the instructions 522 may further be transmitted or received over a network via the network interface device 508.

While the computer-readable storage medium 524 is shown in the illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each operatively coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A cryptographic circuit for cryptographically protecting data in a computer memory, the cryptographic circuit to:
   divide the data into a first portion and a second portion;
   encrypt the first portion of the data to create a first stored form of the data;
   encrypt the second portion of the data, wherein to encrypt the second portion, the cryptographic circuit is further to:
      calculate, using a hash function, a hash based on the first stored form of the data;
      apply a first pseudorandom function to the hash to obtain a bit sequence; and
      combine the bit sequence with the second portion of the data to obtain a second stored form of the data; and store, in the computer memory, the first stored form of the data and the second stored form of the data.

2. The cryptographic circuit of claim 1, wherein the first portion is encrypted using a block-based cipher algorithm.

3. The cryptographic circuit of claim 1, wherein the hash function is at least one of:
   a universal hash function, or
   an almost-universal hash function.

4. The cryptographic circuit of claim 1, wherein at least part of the hash is used to compute a message authentication code.

5. The cryptographic circuit of claim 1, wherein the hash is further based on an address of the first stored form of the data.

6. The cryptographic circuit of claim 1, wherein the hash is further based on a key, wherein the key comprises at least one of:
   a key derived with a second pseudorandom function based on an address of the first stored form of the data,
   a global key, or
   a key obtained from a lookup table based on the address of the first stored form of the data.

7. The cryptographic circuit of claim 6, wherein the key is refreshed when the address of the first stored form of the data is cleared.

8. The cryptographic circuit of claim 1, wherein the second stored form of the data is further encrypted before being stored in the computer memory.

9. A memory buffer device comprising:
   a cryptographic circuit for cryptographically accessing data in a computer memory, wherein the cryptographic circuit is to:
      load, from the computer memory, a first portion of the data and a second portion of the data;
      decrypt the first portion of the data to obtain a first plaintext form of the data;
      decrypt the second portion of the data, wherein to decrypt the second portion, the cryptographic circuit is further to:
         calculate, using a hash function, a hash based on the first portion of the data;
         apply a first pseudorandom function to the hash to obtain a bit sequence; and
         combine the bit sequence with the second portion of the data to obtain a second plaintext form of the data.

10. The memory buffer device of claim 9, wherein the cryptographic circuit is to decrypt the first portion and the second portion in parallel.

11. The memory buffer device of claim 9, wherein the first portion is decrypted using a block-based cipher algorithm.

12. The memory buffer device of claim 9, wherein the hash function is at least one of:
   a universal hash function, or
   an almost-universal hash function.

13. The memory buffer device of claim 9, wherein the hash is further based on an address of the first portion of the data.

14. The memory buffer device of claim 9, wherein the hash is further based on a key, wherein the key comprises at least one of:
   a key derived with a second pseudorandom function based on an address of the first portion of the data,
   a global key, or
   a key obtained from a lookup table based on the address of the first portion of the data.

15. The memory buffer device of claim 14, wherein the key is refreshed when the address of the first portion of the data is cleared.

16. The memory buffer device of claim 9, wherein the second plaintext form is further decrypted.

17. A method of accessing cryptographically protected data of a computer memory, the method comprising:

receiving, on a first interface, the data, wherein the data comprises a first portion and a second portion;

decrypting the first portion of the data to obtain a first plaintext form of the data;

decrypting the second portion of the data, wherein decrypting the second portion comprises:

calculating, using a hash function, a hash based on the first portion of the data;

applying a first pseudorandom function to the hash to obtain an output; and combining the output with the second portion of the data to obtain a second plaintext form of the data; and transmitting, on a second interface, the first plaintext form of the data and the second plaintext form of the data.

18. The method of claim 17, wherein decrypting the first portion and decrypting the second portion are performed in parallel.

19. The method of claim 17, wherein the first portion is decrypted using a block-based cipher algorithm.

20. The method of claim 17, wherein the hash function is at least one of:

a universal hash function, or an almost-universal hash function.

\* \* \* \* \*